United States Patent
Kim et al.

(10) Patent No.: US 9,158,159 B2
(45) Date of Patent: Oct. 13, 2015

(54) LIQUID CRYSTAL DISPLAY PANEL, METHOD OF MANUFACTURING THE SAME AND LIQUID CRYSTAL DISPLAY APPARATUS HAVING THE SAME

(71) Applicants: Samsung Display Co., Ltd., Yongin (KR); Pusan National University Industry-University Cooperation Foundation, Busan (KR)

(72) Inventors: Hoon Kim, Ansan-si (KR); Ki-Chul Shin, Suwon-si (KR); Tae-Hoon Yoon, Busan (KR); Ki-Han Kim, Changwon-si (KR); Sun-Wook Choi, Busan (KR)

(73) Assignee: Samsung Display Co., Ltd., Yongin-si (KR)

( * ) Notice: Subject to any disclaimer, the term of this patent is extended or adjusted under 35 U.S.C. 154(b) by 163 days.

(21) Appl. No.: 13/774,294

(22) Filed: Feb. 22, 2013

(65) Prior Publication Data

US 2014/0125895 A1    May 8, 2014

(30) Foreign Application Priority Data

Nov. 5, 2012   (KR) .......................... 10-2012-0123960

(51) Int. Cl.
    *G02F 1/1337*  (2006.01)
    *G02F 1/139*   (2006.01)

(52) U.S. Cl.
    CPC .... *G02F 1/133711* (2013.01); *G02F 1/133753* (2013.01); *G02F 1/1393* (2013.01); *G02F 1/133788* (2013.01); *G02F 2001/133726* (2013.01); *G02F 2001/133761* (2013.01)

(58) Field of Classification Search
    CPC ............... G02F 2001/133761; G02F 1/133753
    USPC .................................................. 349/129, 123
    See application file for complete search history.

(56) References Cited

U.S. PATENT DOCUMENTS

| 7,102,706 B2    | 9/2006 | Kim et al. |
| 2007/0070287 A1* | 3/2007 | Lee et al. ...................... 349/156 |
| 2010/0053526 A1 | 3/2010 | Kye et al. |
| 2011/0212393 A1* | 9/2011 | Chiu et al. ...................... 430/20 |

FOREIGN PATENT DOCUMENTS

JP         2004-302168        10/2004

\* cited by examiner

*Primary Examiner* — Nathanael R Briggs
(74) *Attorney, Agent, or Firm* — H.C. Park & Associates, PLC

(57) ABSTRACT

A liquid crystal display panel includes a lower substrate, an upper substrate and a liquid crystal layer. The lower substrate includes a first base substrate and a pixel electrode formed on the first base substrate. The first base substrate includes a first sub pixel area and a second sub pixel area. The upper substrate includes a second base substrate and a common electrode formed on the second base substrate. The liquid crystal layer is interposed between the lower substrate and the upper substrate, and includes a first polymer disposed in the first sub pixel area and a second polymer disposed in the second pixel area. The first polymer has a first pre-tilt, and the second polymer has a second pre-tilt different from the first pre-tilt. Thus, a display quality of a liquid crystal display apparatus including the liquid crystal display panel may be enhanced.

7 Claims, 18 Drawing Sheets

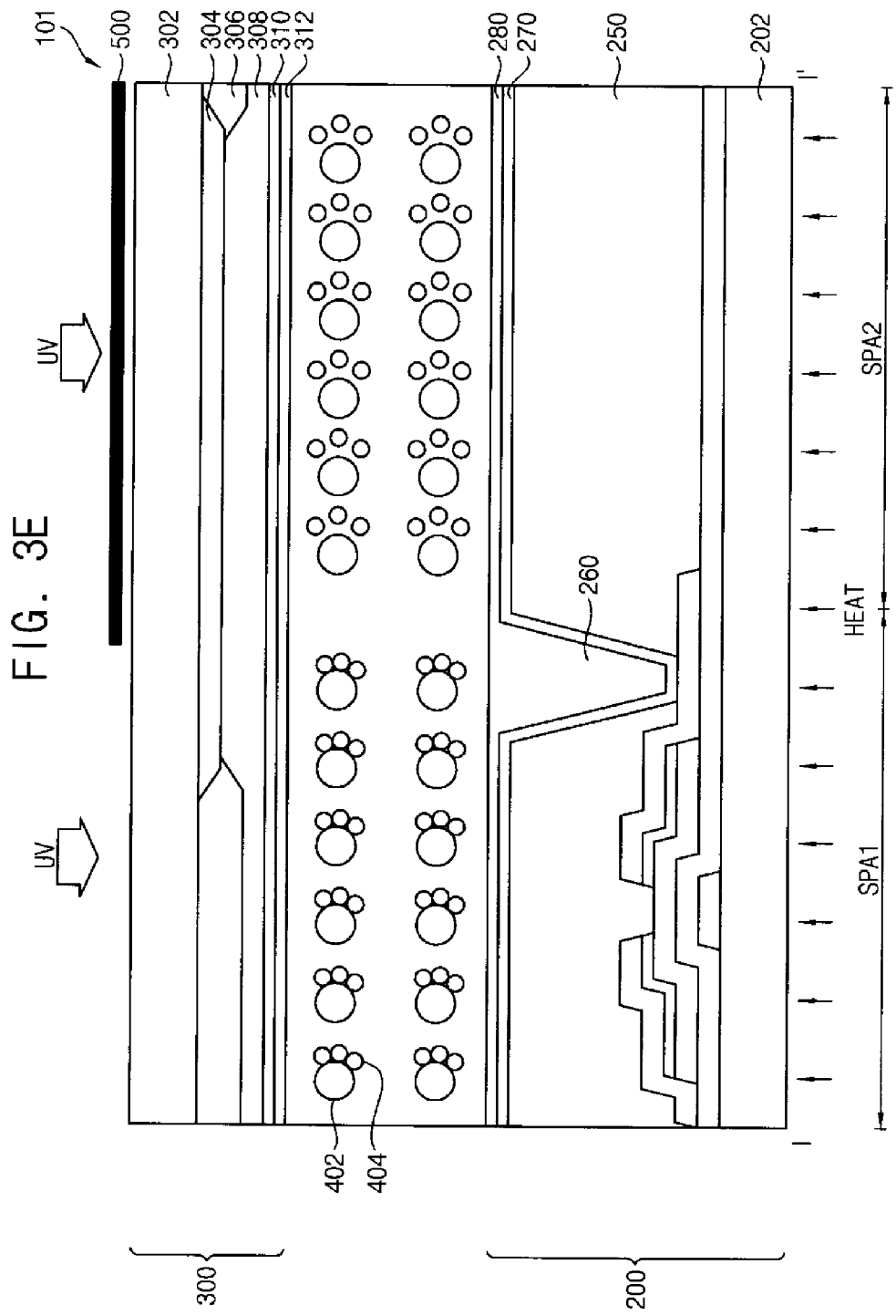

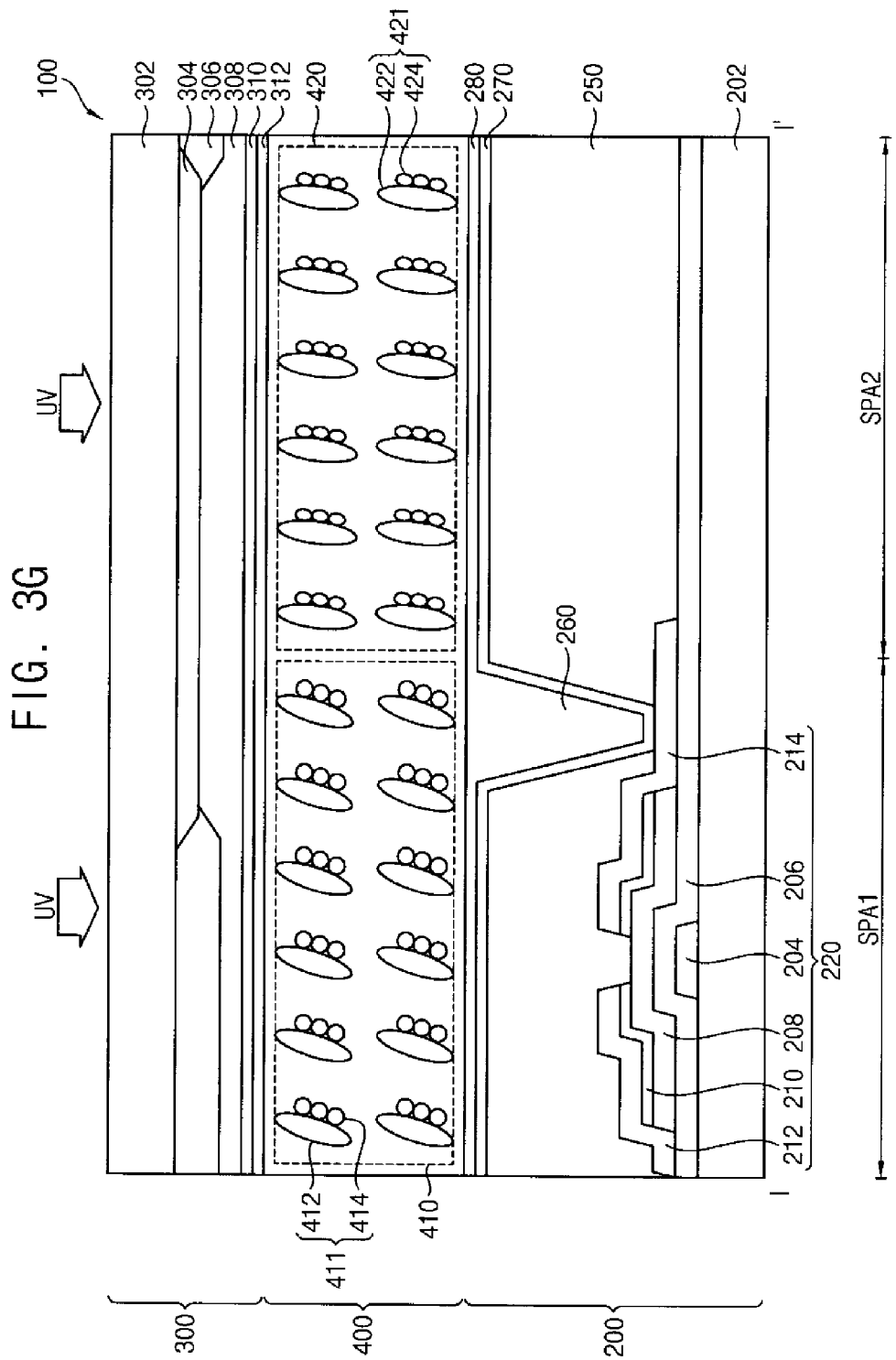

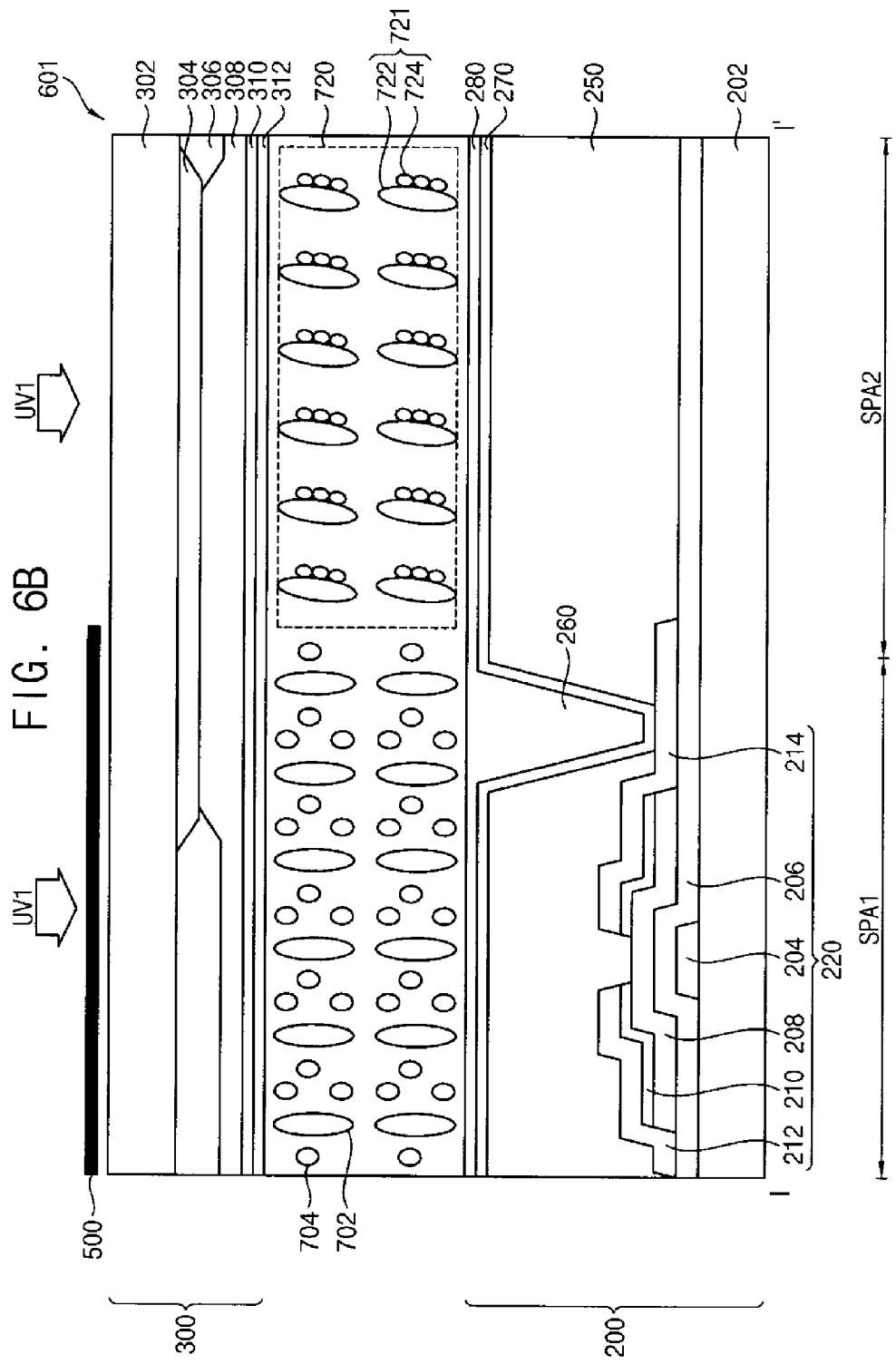

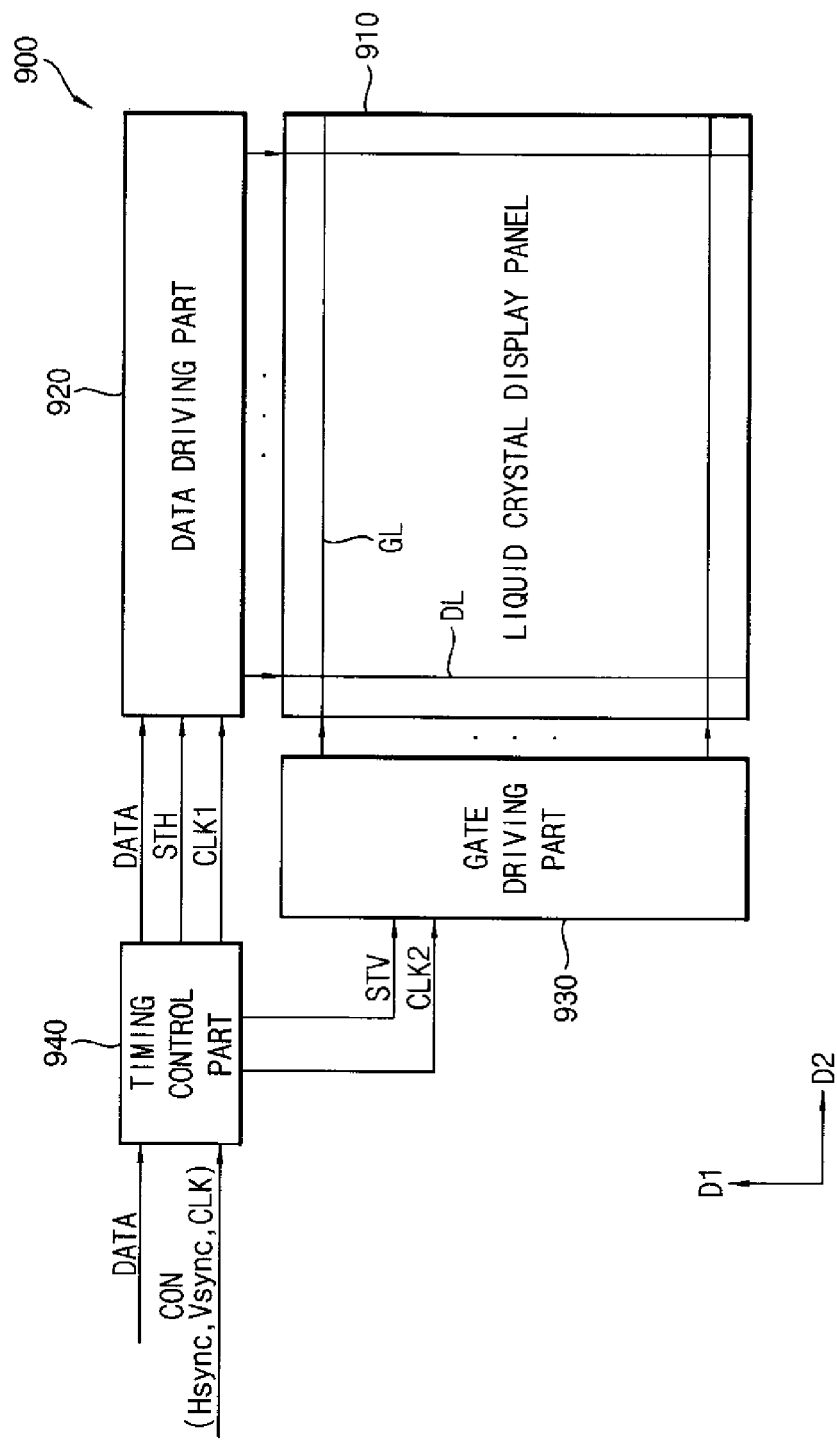

LIQUID CRYSTAL DISPLAY PANEL, METHOD OF MANUFACTURING THE SAME AND LIQUID CRYSTAL DISPLAY APPARATUS HAVING THE SAME

PRIORITY STATEMENT

This application claims priority from and the benefit of Korean Patent Application No. 10-2012-0123960, filed on Nov. 5, 2012 in the Korean Intellectual Property Office (KIPO), which is hereby incorporated by reference for all purposes as if fully set forth herein.

BACKGROUND

1. Field

Exemplary embodiments of the present invention relate to a liquid crystal display panel, a method of manufacturing the liquid crystal display panel and a liquid crystal display apparatus having the liquid crystal display panel. More particularly, embodiments of the present invention relate to a liquid crystal display panel having a liquid crystal, a method of manufacturing the liquid crystal display panel and a liquid crystal display apparatus having the liquid crystal display panel.

2. Discussion of the Background

A liquid crystal display panel of a display apparatus has been developed to increase a response speed of a liquid crystal so as to improve a display quality of the liquid crystal display apparatus.

A pre-tilt of the liquid crystal may be formed so that the response speed of the liquid crystal may be increased. A pre-tilt of the liquid crystal may be formed, for example, by the following procedure: an electric field is applied between a pixel electrode of a lower substrate and a common electrode of an upper substrate, and then ultraviolet rays are irradiated onto a light-stiffening material of a light alignment layer.

Conventionally, in order to form the pre-tilt to the liquid crystal, a process of forming the electric field between the pixel electrode and the common electrode may be required to be performed before irradiating the ultraviolet ray. Accordingly, a manufacturing process of the liquid crystal display panel is complicated by the fact that an electric filed, and specific equipment for forming the electric field is required.

The above information disclosed in this background section is only for enhancement of understanding of the background of the invention and therefore it may contain information that does not form any part of the prior art.

SUMMARY OF THE INVENTION

Exemplary embodiments of the present invention provide a liquid crystal display panel enhancing a display quality of a liquid crystal display apparatus.

Exemplary embodiments of the present invention also provide a method of manufacturing the above-mentioned liquid crystal display panel.

Exemplary embodiments of the present invention also provide a liquid crystal display apparatus having the above-mentioned liquid crystal display panel.

According to an exemplary embodiment of the present invention, a liquid crystal display panel includes a lower substrate, an upper substrate and a liquid crystal layer. The lower substrate includes a first base substrate and a pixel electrode formed on the first base substrate. The first base substrate includes a first sub pixel area and a second sub pixel area. The upper substrate includes a second base substrate and a common electrode formed on the second base substrate. The second base substrate faces the first base substrate. The liquid crystal layer is interposed between the lower substrate and the upper substrate, and includes a first polymer disposed in the first sub pixel area and a second polymer disposed in the second pixel area. The first polymer has a first pre-tilt and the second polymer has a second pre-tilt different from the first pre-tilt.

According to another exemplary embodiment of the present invention, there is a provided a method of manufacturing a liquid crystal display panel. In the method, a pixel electrode is formed on a first base substrate including a first sub pixel area and a second sub pixel area to form a lower substrate. A common electrode is formed on a second base substrate facing the first base substrate to form an upper substrate. A liquid crystal layer is formed between the lower substrate and the upper substrate. The liquid crystal layer includes a first polymer disposed in the first sub pixel area and a second polymer disposed in the second sub pixel area. The first polymer has a first pre-tilt, and the second polymer has a second pre-tilt different from the first pre-tilt.

According to still another exemplary embodiment of the present invention, a liquid crystal display apparatus includes a liquid crystal display panel, a gate driving part and a data driving part. The liquid crystal display panel includes a lower substrate including a first base substrate having a first sub pixel area and a second sub pixel area, a gate line, a data line and a pixel electrode formed on the first base substrate, an upper substrate including a second base substrate facing the first base substrate and a common electrode formed on the second base substrate, and a liquid crystal layer interposed between the lower substrate and the upper substrate, and including a first polymer disposed in the first sub pixel area and a second polymer disposed in the second pixel area. The first polymer has a first pre-tilt, and the second polymer has a second pre-tilt different from the first pre-tilt. The gate driving part is configured to apply a gate signal to the gate line of the liquid crystal display panel. The data driving part is configured to apply a data signal to the data line of the liquid crystal display panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIGS. 3A, 3B, 3C, 3D, 3E, 3F, and 3G are cross-sectional views illustrating a method of manufacturing the liquid crystal display panel in FIGS. 1 and 2.

FIGS. 6A, 6B and 6C are cross-sectional views illustrating a method of manufacturing the liquid crystal display panel in FIG. 5.

FIG. 9 is a block diagram illustrating a liquid crystal display apparatus according to still another exemplary embodiment of the present invention.

DETAILED DESCRIPTION OF THE ILLUSTRATED EMBODIMENTS

Figure 1:
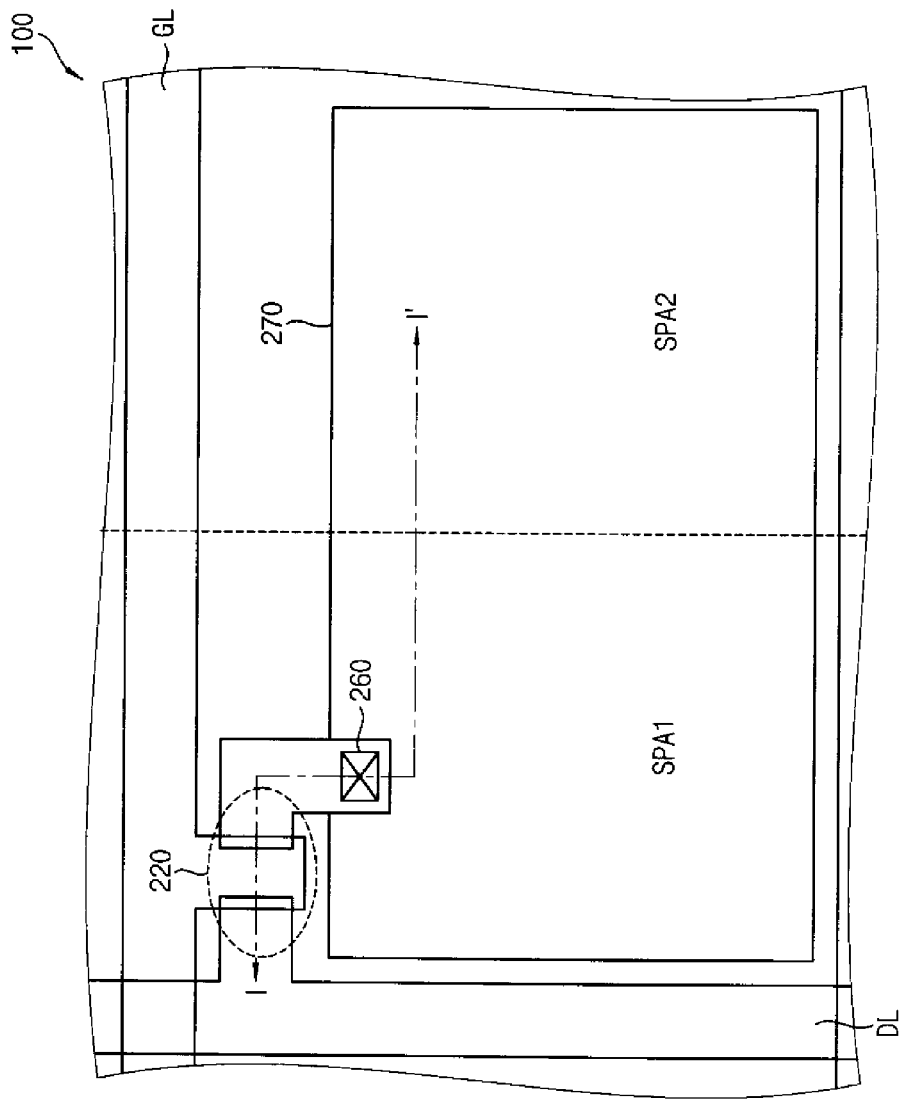
FIG. 1 is a plan view illustrating a liquid crystal display panel according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 2:
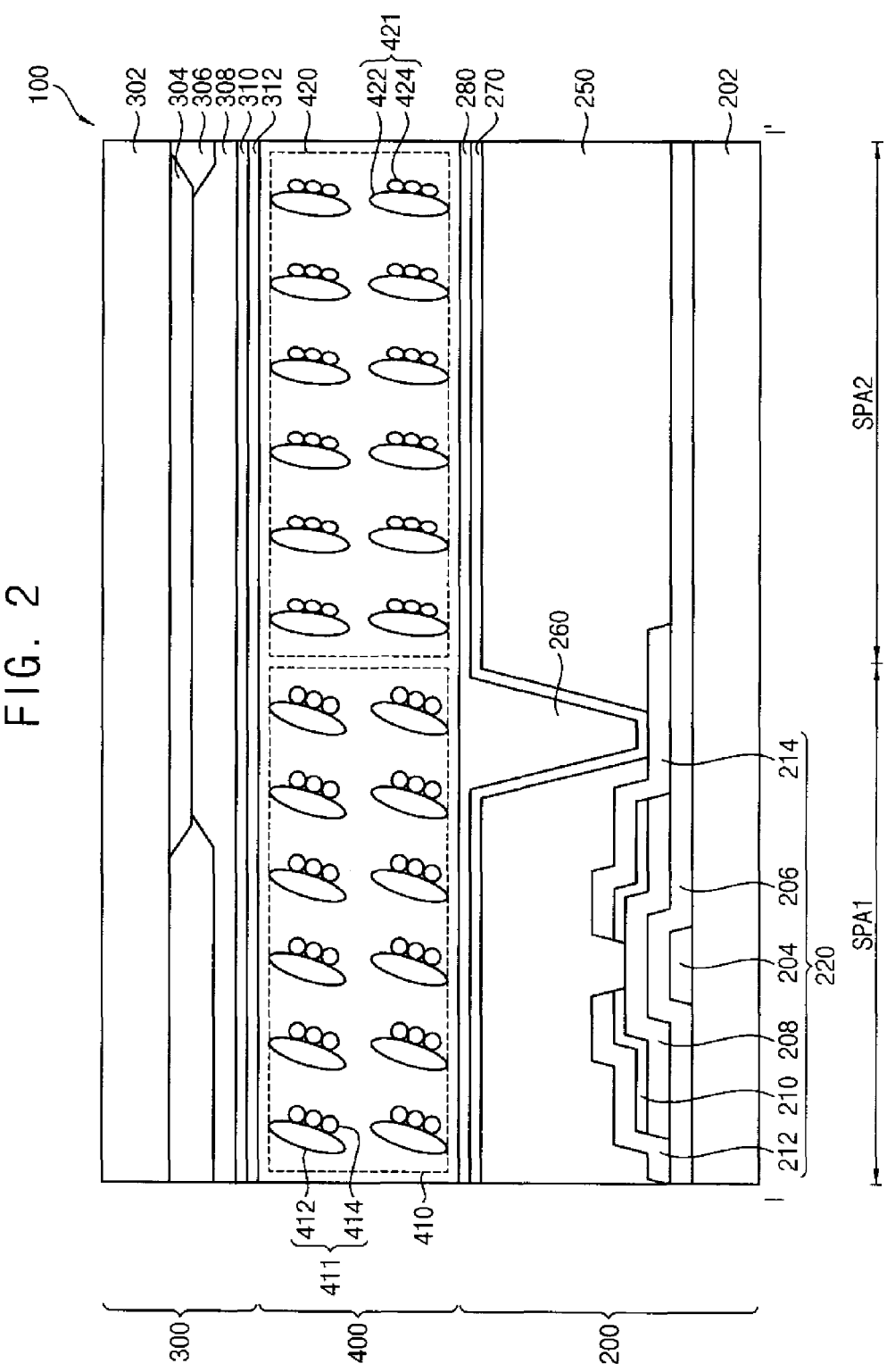
FIG. 2 is a cross-sectional view taken along a line I-I' of FIG. 1.

FIG. 1 is a plan view illustrating a liquid crystal display panel according to an exemplary embodiment of the present invention, and FIG. 2 is a cross-sectional view taken along a line I-I' of FIG. 1.

Referring to FIGS. 1 and 2, the liquid crystal display panel 100 according to the present exemplary embodiment includes a lower substrate 200, an upper substrate 300 and a liquid crystal layer 400.

The lower substrate 200 includes a first base substrate 202, a thin-film transistor 220, an organic insulating layer 250 and a pixel electrode 270.

The first base substrate 202 includes a first sub pixel area SPA1 and a second sub pixel area SPA2. The first sub pixel area SPA1 and the second sub pixel area SPA2 may form a pixel area. The first base substrate 202 may be a glass substrate or a plastic substrate.

The thin-film transistor 220 is formed on the first base substrate 202. The thin-film transistor 220 includes a gate electrode 204 extended from a gate line GL, a gate insulating layer 206 formed on the gate electrode 204, an active layer 208 formed on the gate insulating layer 206, an ohmic-contact layer 210 separately formed on the active layer 208, a source electrode 212 formed on the ohmic-contact layer 210 and extended from a data line DL, and a drain electrode 214 formed on the ohmic-contact layer 210 and spaced apart from the source electrode 212.

The organic insulating layer 250 is formed on the thin-film transistor 220 to protect the thin-film transistor 220. Although shown and described as a single organic insulating layer, layer 250 may include multiple layers. Furthermore, layer 250 may alternatively include an inorganic insulating layer and an organic insulating layer or multiple inorganic and organic insulating layers in any combination.

The pixel electrode 270 is formed on the organic insulating layer 250, and electrically connected to the drain electrode 214 of the thin-film transistor 220 through a contact hole 260 formed through the organic insulating layer 250. The pixel electrode 270 may include a conductive material such as an indium tin oxide (ITO) or an indium zinc oxide (IZO).

The upper substrate 300 includes a second base substrate 302 facing the first base substrate 202, a color filter 304 formed on the second base substrate 302, a light blocking layer 306 formed on the color filter 304, an over-coating layer 308 formed on the color filter 304 and the light blocking layer 306, and a common electrode 310 formed on the over-coating layer 308.

The liquid crystal layer 400 includes a first liquid crystal layer 410 and a second liquid crystal layer 420.

The first liquid crystal layer 410 is disposed in the first sub pixel area SPA1. The first liquid crystal layer 410 includes a first polymer 411 having a first pre-tilt. The first polymer 411 includes a first liquid crystal 412 and a first reactive mesogen 414 polymerized in the first liquid crystal 412. The first reactive mesogen 414 may be an isotropic reactive mesogen. Thus, the first polymer 411 may be an isotropic polymer.

The second liquid crystal layer 420 is disposed in the second sub pixel area SPA2. The second liquid crystal layer 420 includes a second polymer 421 having a second pre-tilt. The second pre-tilt may be less than the first pre-tilt. The second polymer 421 includes a second liquid crystal 422 and a second reactive mesogen 424 polymerized in the second liquid crystal 422. The second reactive mesogen 424 may be an anisotropic reactive mesogen. Thus, the second polymer 421 may be an anisotropic polymer. However, the invention is not limited thereto, for example, the display apparatus may be configured such that the first polymer 411 is an anisotropic polymer and the second polymer 421 is an isotropic polymer.

When an electric field is not formed between the pixel electrode 270 and the common electrode 310, the first liquid crystal 412 and the second liquid crystal 422 are vertically aligned. Thus, the liquid crystal display panel 100 may be a vertically aligned mode.

The lower substrate 200 may further include a first alignment layer 280 formed on the pixel electrode 270 to align the first liquid crystal 412 and the second liquid crystal 422. In addition, the upper substrate 300 may further include a second alignment layer 312 formed on the common electrode 310 to align the first liquid crystal 412 and the second liquid crystal 422.

FIGS. 3A to 3G are cross-sectional views illustrating a method of manufacturing the liquid crystal display panel 100 in FIGS. 1 and 2.

Figure 3A:
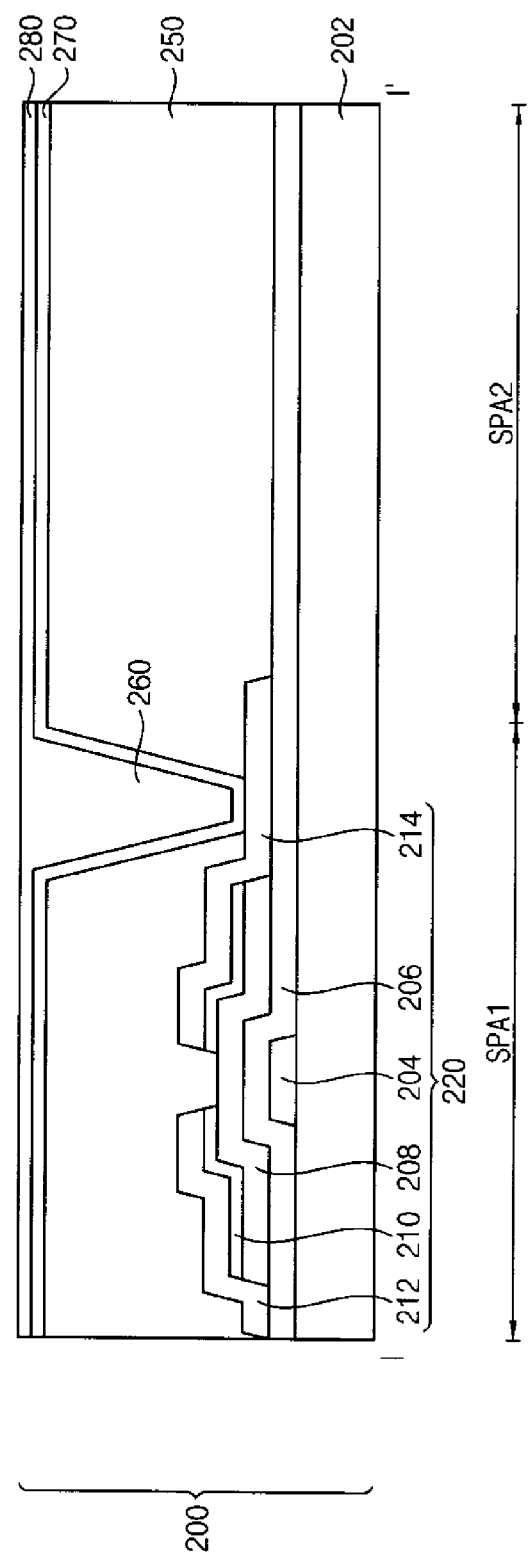

Referring to FIG. 3A, the lower substrate 200 is formed. Specifically, the thin-film transistor 220 is formed on the first base substrate 202 having the first sub pixel area SPA1 and the second sub pixel area SPA2, the organic insulating layer 250 is formed on the thin-film transistor 220, and pixel electrode 270 is formed on the organic insulating layer 250, and the first alignment layer 280 is formed on the pixel electrode 270.

Figure 3B:
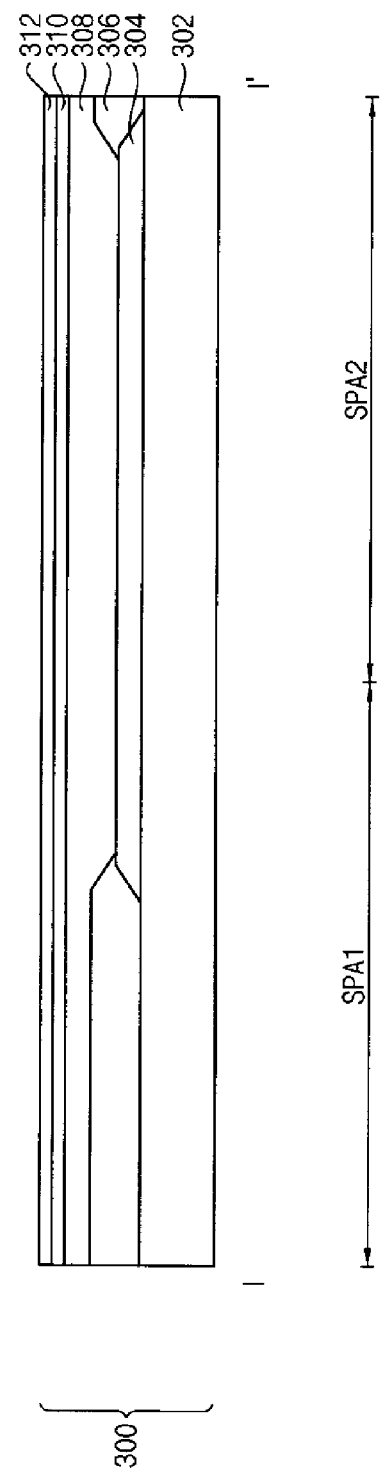

Referring to FIG. 3B, the upper substrate 300 is formed. Specifically, the color filter 304 and the light blocking layer 306 are formed on the second base substrate 302, the over-coating layer 308 is formed on the color filter 304 and the light blocking layer 306, the common electrode 310 is formed on the over-coating layer 308, and the second alignment layer 312 is formed on the common electrode 310.

Figure 3C:
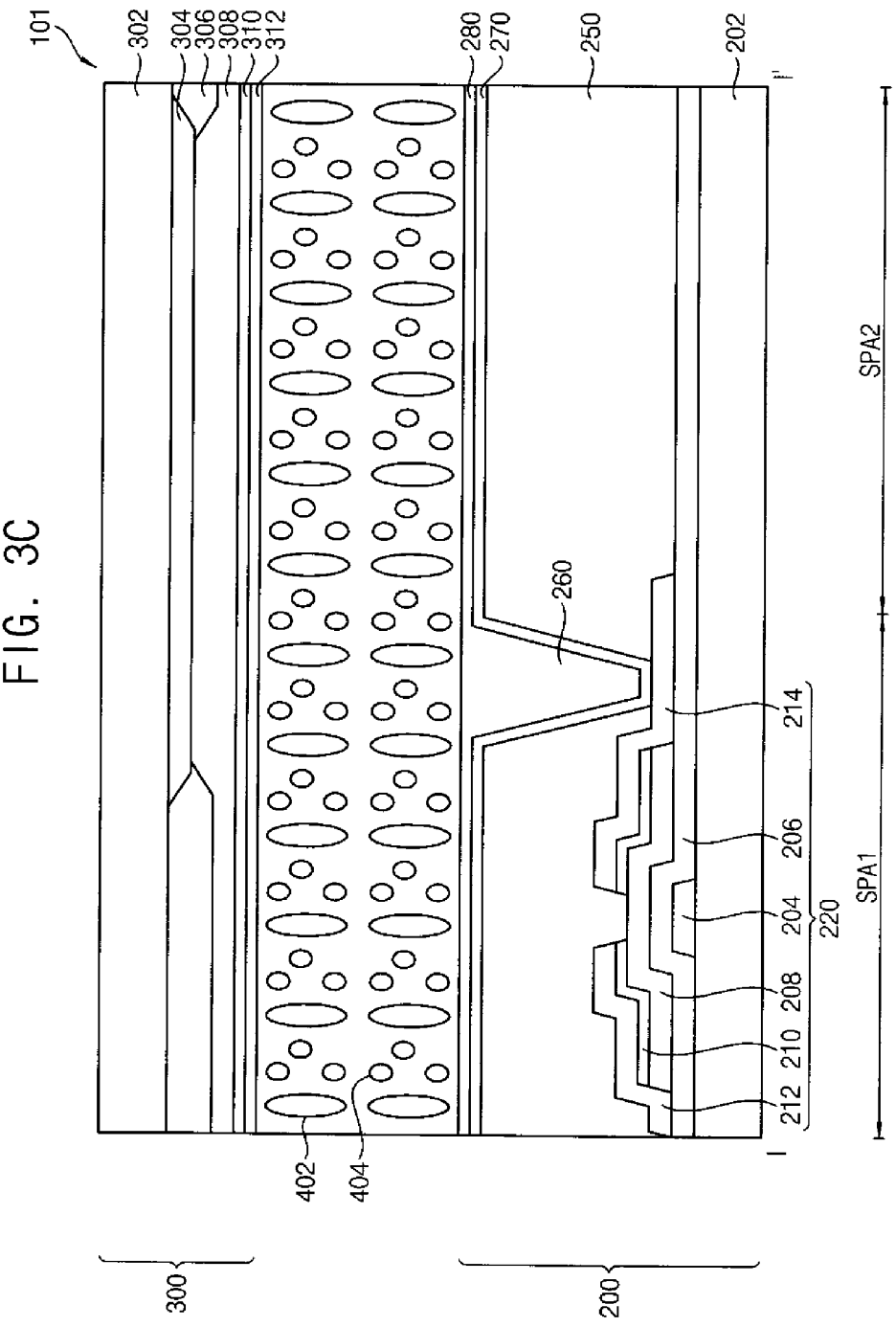

Referring to FIG. 3C, the lower substrate 200 and the upper substrate 300 are combined, and a liquid crystal 402 and a reactive mesogen 404 are injected between the upper substrate and the lower substrate. Thus, the panel 101 is formed. The liquid crystal 402 may be an anisotropic liquid crystal, and the reactive mesogen 404 may be an anisotropic reactive mesogen. In addition, the liquid crystal 402 and the reactive mesogen 404 may be vertically aligned by the first alignment layer 280 and the second alignment layer 312.

Figure 3D:
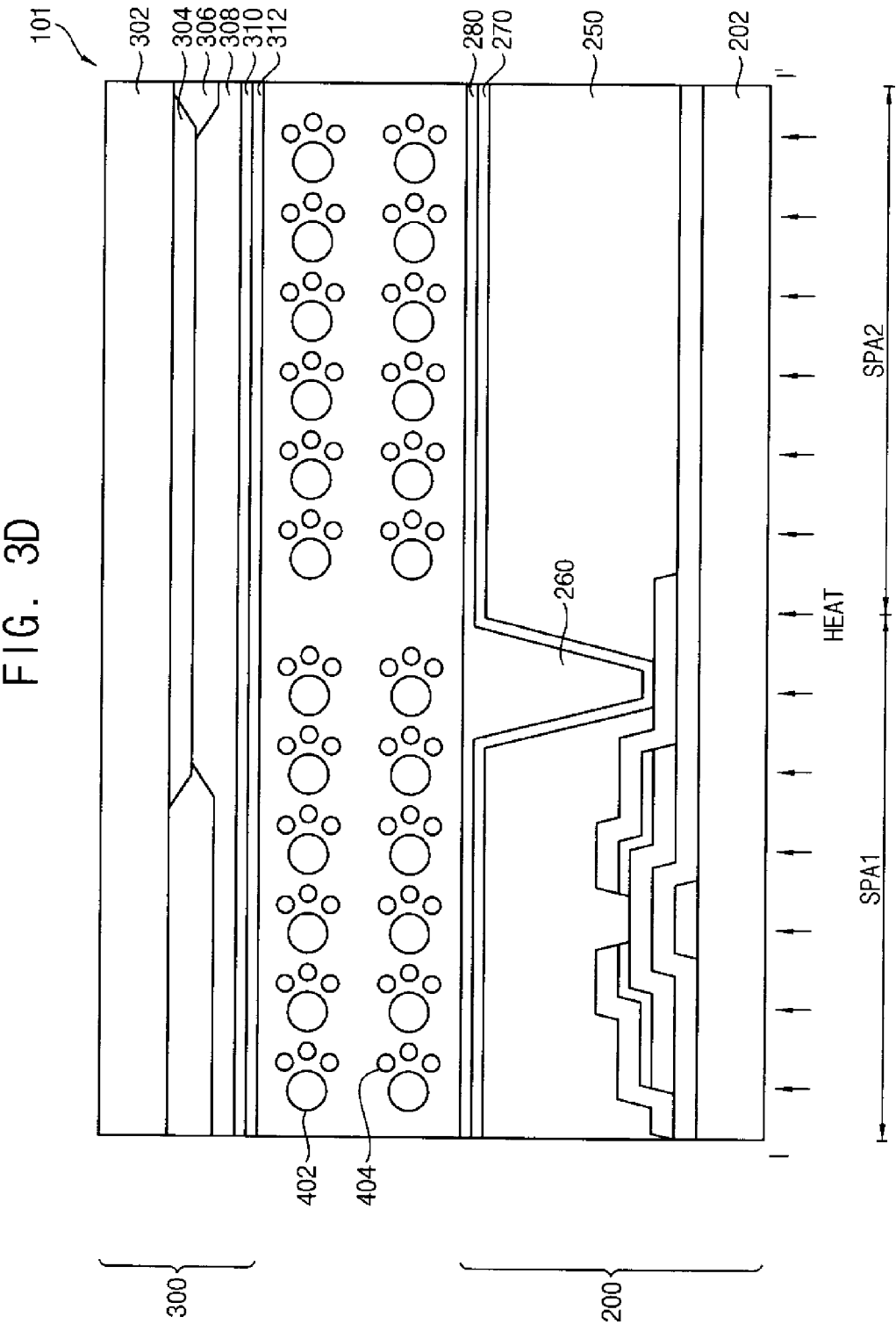

Referring to FIG. 3D, heat is applied to the panel 101 to increase the temperature of the panel 101. For example, the temperature of the panel 101 may be increased to about 60° C. Thus, the reactive mesogen 404 may be converted to an isotropic reactive mesogen. Alternatively, the temperature of the panel 101 may be increased to about 90° C. Thus, the liquid crystal 402 may be converted to an isotropic liquid crystal, and the reactive mesogen 404 may be converted to an isotropic reactive mesogen. Here, the temperature of the display panel may be increased or adjusted to other temperatures or ranges of temperatures.

Referring to FIG. 3E, ultraviolet radiation UV is applied to the first sub pixel area SPA1 of the panel 101. Thus, the liquid crystal 402 and the reactive mesogen 404 disposed in the first sub pixel area SPA1 are polymerized. A light blocking mask 500 may be disposed over the second sub pixel area SPA2 of the panel 101. Thus, the liquid crystal 402 and the reactive mesogen 404 disposed in the second sub pixel area SPA2 are not polymerized. Heat may be applied to the panel 101 during the time period when UV radiation is also applied to the panel 101 as shown in FIG. 3E. Alternatively, heat may not be applied to the panel 101 during the time period when UV radiation is also applied to the panel 101

Figure 3F:
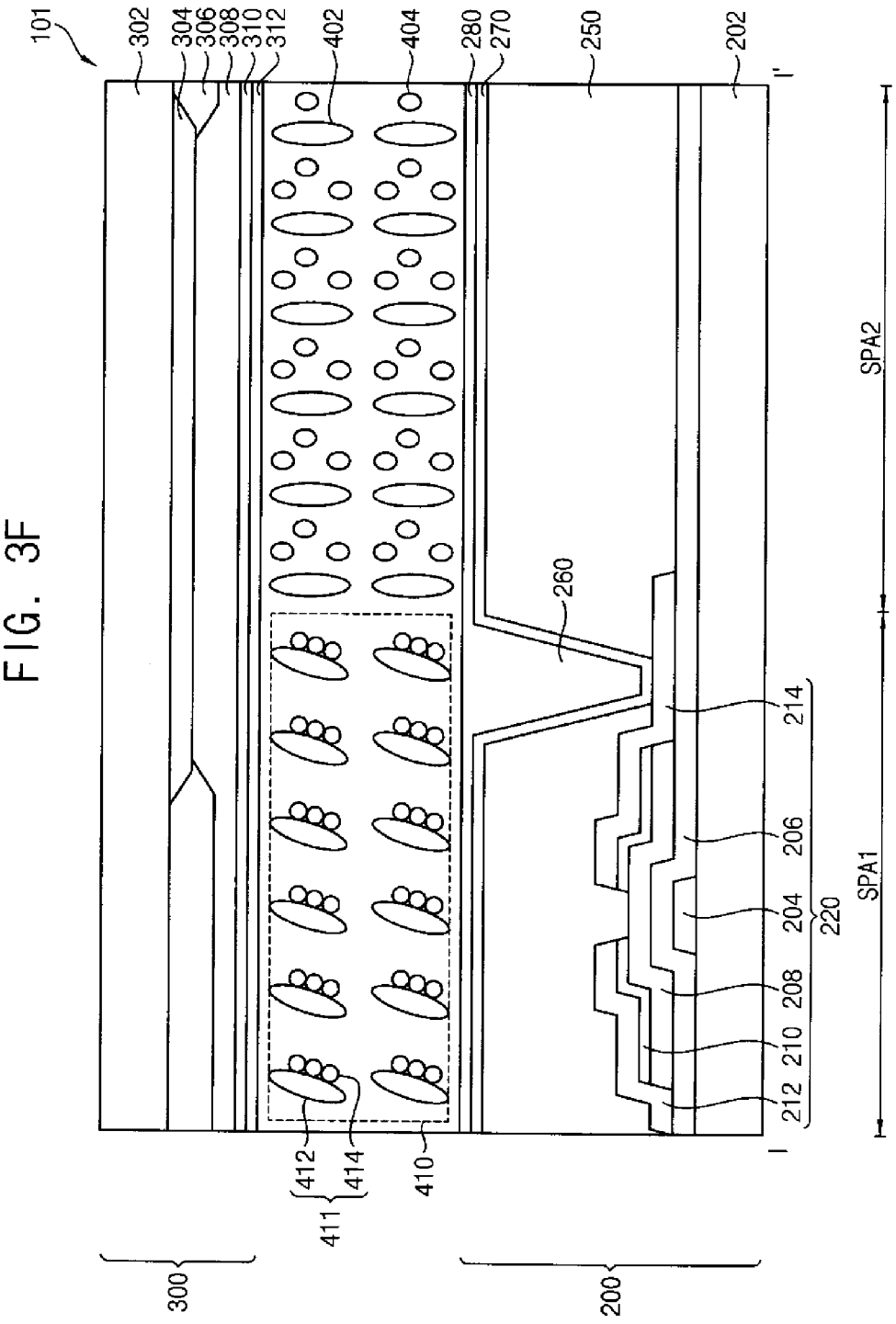

Referring to FIG. 3F, the temperature of the panel 101 is decreased. For example, the temperature of the panel 101 may be decreased to about 20° C. Thus, the first liquid crystal layer 410 including the first polymer 411 is formed in the first sub pixel area SPA1. The first polymer 411 may be the isotropic polymer including the isotropic reactive mesogen 414. In addition, the liquid crystal 402 disposed in the second sub pixel area SPA2 is converted to an anisotropic liquid crystal, and the reactive mesogen 404 is converted to an anisotropic reactive mesogen. Here, the temperature of the display panel can be increased adjusted to other temperatures or ranges of temperatures.

Referring to FIG. 3G, the ultraviolet radiation UV is applied to the second sub pixel area SPA2 of the panel 101. Therefore, the liquid crystal 402 and the reactive mesogen 404 disposed in the second sub pixel area SPA2 are polymerized, and thus the second liquid crystal 420 including the second polymer 421 in the second sub pixel area SPA2 is formed. The second polymer 421 may be the anisotropic polymer including an anisotropic reactive mesogen 424. Thus, the liquid crystal layer 400 including the first liquid crystal layer 410 and the second liquid crystal layer 420 is formed, and the liquid crystal display panel 100 is formed. As seen in FIG. 3G, at this stage, the ultraviolet radiation UV may be applied to both SPA1 and SPA2 simultaneously. Alternatively, the ultraviolet radiation UV may be applied only to the second sub pixel area SPA2 by using a light blocking mask such as the mask 500 in FIG. 3F to block the UV radiation incident on the first sub pixel area SPA1.

Figure 4A:
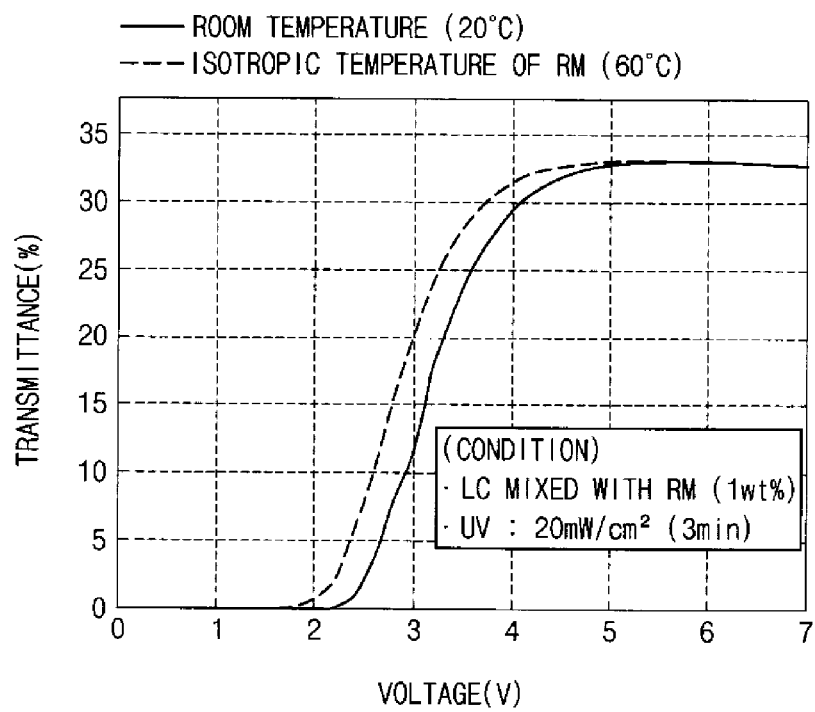
FIGS. 4A and 4B are graphs illustrating a transmittance of a liquid crystal layer according to a voltage between a pixel electrode and a common electrode.
Figure 4B:
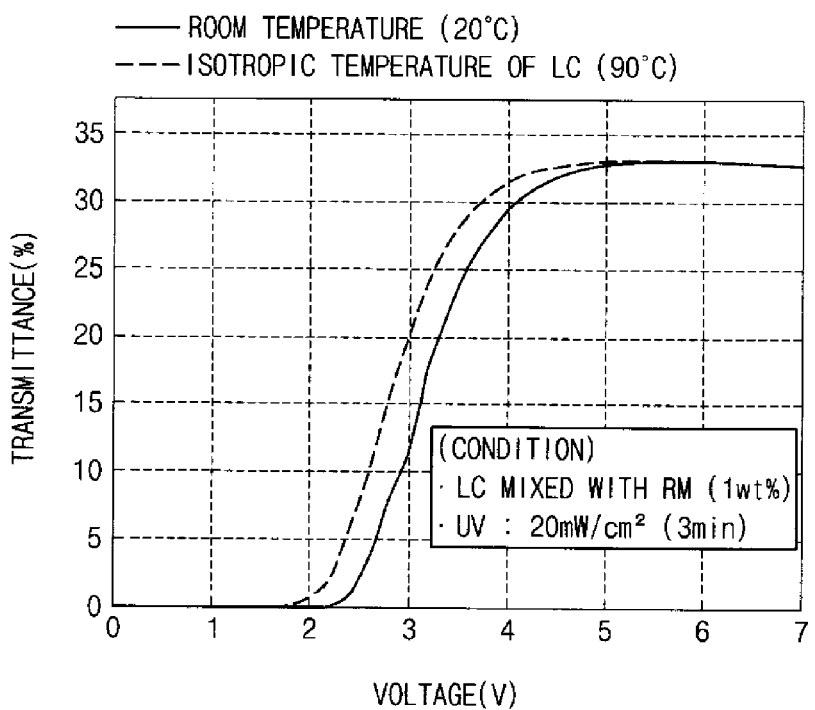

FIGS. 4A and 4B are graphs illustrating a transmittance of the liquid crystal layer 400 according to the voltage between the pixel electrode 270 and the common electrode 310.

Referring to FIGS. 1 to 4A, the content of the first reactive mesogen 414 and the second reactive mesogen 424 in the liquid crystal layer 400 may be about 1 wt %.

The temperature of the panel 101 during which the ultraviolet ray UV is applied to the first sub pixel area SPA1 of the panel 101 may be about 60 degrees Celsius as illustrated in FIGS. 3D, 3E and 4A. In addition, the ultraviolet ray UV may be applied to the first sub pixel area SPA1 of the panel 101 for about 3 minutes, and the ultraviolet ray UV may be applied to the second sub pixel area SPA2 of the panel 101 for about 3 minutes.

Referring the graph of FIG. 4A, the dashed line graph shows a first voltage-transmittance characteristic indicating the dependence of the transmittance of the first liquid crystal layer 410 including the polymer 411 on the voltage between the pixel electrode 270 and the common electrode 310. The solid line graph shows a second voltage-transmittance characteristic indicating the dependence of the transmittance of the second liquid crystal layer 420 including the polymer 421 on the voltage between the pixel electrode 270 and the common electrode 310. The first voltage-transmittance characteristics corresponding to the first liquid crystal layer 410 disposed in the first pixel SPA1 is different from the second voltage characteristic corresponding to the second liquid crystal layer 420 disposed in the second pixel SPA2.

Specifically, a first thread voltage corresponding to the first liquid crystal layer 410 including the first polymer 411 is about 1.7 volts, whereas a second thread voltage corresponding to the second liquid crystal layer 420 including the second polymer 421 is about 2.3 volts. Thus, the first thread voltage corresponding to the first liquid crystal layer 410 is less than the second thread voltage corresponding to the second liquid crystal layer 420.

In addition, when the voltage between the pixel electrode 270 and the common electrode 310 is from about 1.7 volts to about 5.0 volts, a first transmittance corresponding to the first liquid crystal layer 410 including the first polymer 411 is greater than a second transmittance corresponding to the second liquid crystal layer 420 including the second polymer 421, when the first and the second transmittance are measured at the same voltage.

Referring to FIGS. 1 to 3G and 4B, the content of the first reactive mesogen 414 and the second reactive mesogen 424 in the liquid crystal layer 400 may be about 1 wt %.

The temperature of the panel 101 during which the ultraviolet ray UV is applied to the first sub pixel area SPA1 of the panel 101 may be about 90° C. as illustrated in FIGS. 3D, 3E and 4B. In addition, the ultraviolet ray UV may be applied to the first sub pixel area SPA1 of the panel 101 for about 3 minutes, and the ultraviolet ray UV may be applied to the second sub pixel area SPA2 of the panel 101 for about 3 minutes.

Referring the graph of the FIG. 4B, the dashed line graph shows a first voltage-transmittance characteristic indicating the dependence of the transmittance of the first liquid crystal layer 410 including the first polymer 411 on the voltage between the pixel electrode 270 and the common electrode 310. The solid line graph shows a second voltage-transmittance characteristic indicating the dependence of the transmittance of the second liquid crystal layer 420 including the second polymer 421 on the voltage between the pixel electrode 270 and the common electrode 310. The first voltage-transmittance characteristics corresponding to the first liquid crystal layer 410 disposed in the first pixel SPA1 is different from the second voltage-transmittance characteristic corresponding to the second liquid crystal layer 420 disposed in the second pixel SPA2.

Specifically, a first thread voltage corresponding to the first liquid crystal layer 410 including the first polymer 411 is about 1.9 volts, and a second thread voltage corresponding to the second liquid crystal layer 420 including the second polymer 421 is about 2.2 volts. Thus, the first thread voltage with respect to the first liquid crystal layer 410 is less than the second thread voltage with respect to the second liquid crystal layer 420.

In addition, when the voltage between the pixel electrode 270 and the common electrode 310 is from about 1.9 volts to about 5.0 volts, a first transmittance corresponding to the first liquid crystal layer 410 including the first polymer 411 is greater than a second transmittance corresponding to the second liquid crystal layer 420 including the second polymer 421, when the first and second transmittance are measured at the same voltage.

In the present exemplary embodiment, the first pre-tilt of the first polymer 411 is greater than the second pre-tilt of the second polymer 421, but the invention is not limited thereto. For example, the first pre-tilt of the first polymer 411 may be less than the second pre-tilt of the second polymer 421.

According to the present exemplary embodiment, the first liquid crystal layer 412 having a first pre-tilt and the second liquid crystal layer 422 having the second pre-tilt is manufactured by a method that does not involve the formation of an electric field between the pixel electrode 270 and the common electrode 310 before applying the ultraviolet ray UV to the panel 101. Therefore a simple way of forming a pre-tilt is provided for both the first liquid crystal 412 and the second liquid crystal 422 of the liquid crystal layer 400. Thus, the degradation of a contrast ratio that may occur during a process of forming the pre-tilt by applying an electric field may be prevented, and a response speed of the first liquid crystal 412 and the second liquid crystal 422 may be increased.

In addition, the first liquid crystal 412 disposed in the first sub pixel area SPA1 has the first pre-tilt, and the second liquid crystal 422 disposed in the second sub pixel area SPA2 has the second pre-tilt different from the first pre-tilt. Therefore, a multi-domain may be implemented, and thus a visibility angle of the liquid crystal display panel 100 may be increased.

Figure 5:
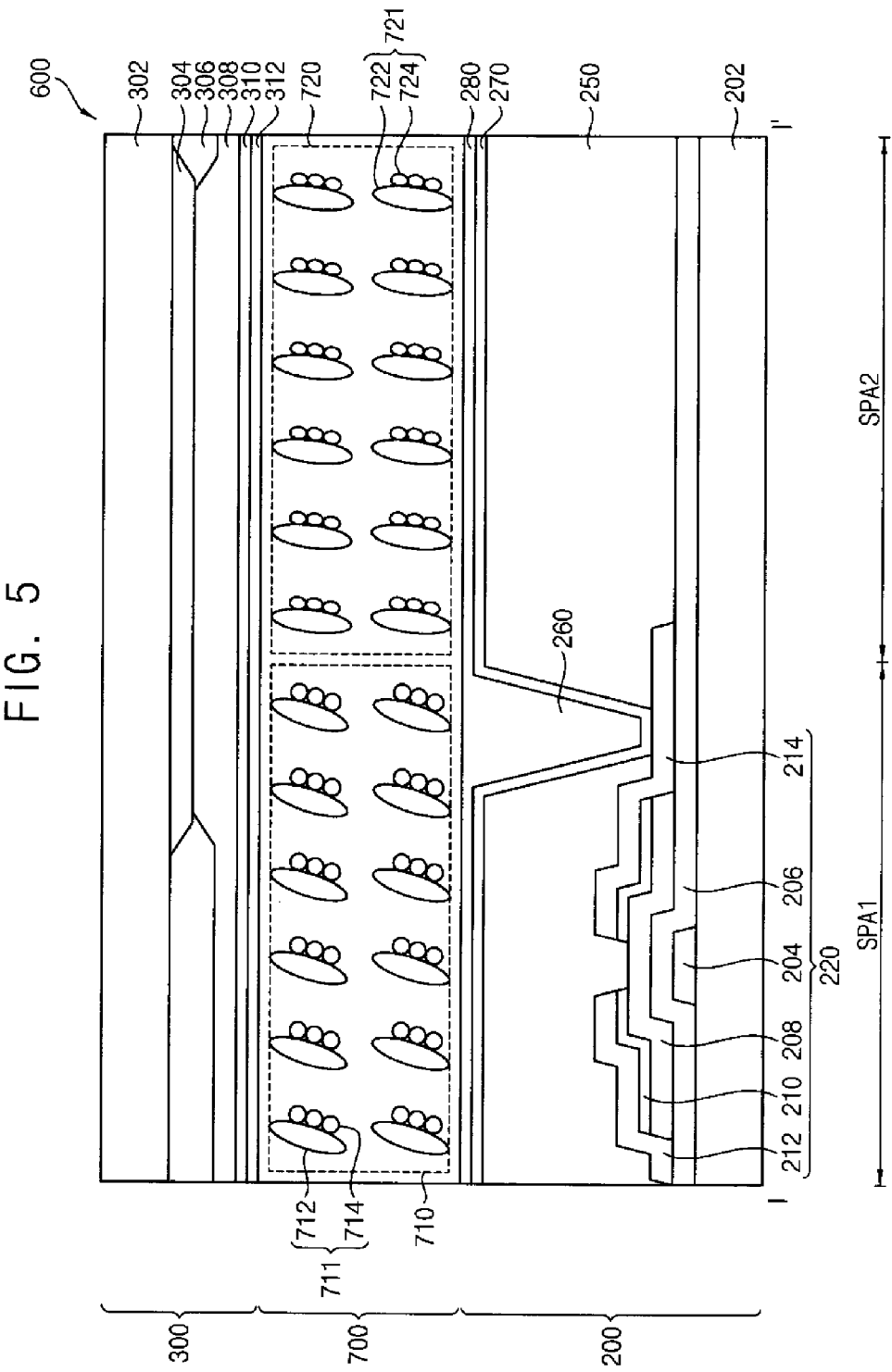
FIG. 5 is a cross-sectional view illustrating a liquid crystal display panel according to another exemplary embodiment of the present invention.

FIG. 5 is a cross-sectional view illustrating a liquid crystal display panel according to another exemplary embodiment of the present invention.

The liquid crystal display panel 600 according to this exemplary embodiment is substantially the same as the liquid crystal display panel 100 according to the previous exemplary embodiment illustrated in FIGS. 1 and 2 except for the liquid crystal layer 700. Thus, the same reference numerals will be used to refer to same or like parts as those described in the previous exemplary embodiment and any further repetitive explanation concerning the above elements will be omitted.

Referring to FIG. 5, the liquid crystal display panel 600 according to the present exemplary embodiment includes the lower substrate 200, the upper substrate 300 and the liquid crystal layer 700.

The liquid crystal layer 700 includes a first liquid crystal layer 710 and a second liquid crystal layer 720.

The first liquid crystal layer 710 is disposed in the first sub pixel area SPA1. The first liquid crystal layer 710 includes a first polymer 711 having a first pre-tilt. The first polymer 711 includes a first liquid crystal 712 and a first reactive mesogen 714 polymerized in the first liquid crystal 712. The first reactive mesogen 714 may be an anisotropic reactive mesogen. Thus, the first polymer 711 may be an anisotropic polymer.

The second liquid crystal layer 720 is disposed in the second sub pixel area SPA2. The second liquid crystal layer 720 includes a second polymer 721 having a second pre-tilt. The second pre-tilt may be less than the first pre-tilt. The second polymer 721 includes a second liquid crystal 722 and a second reactive mesogen 724 polymerized in the second liquid crystal 722. The second reactive mesogen 724 may be an anisotropic reactive mesogen. Thus, the second polymer 721 may be an anisotropic polymer. However, the invention is not limited thereto, for example, the display apparatus may be configured such that the first polymer 711 is an anisotropic polymer and the second polymer 721 is an isotropic polymer.

When an electric field is not formed between the pixel electrode 270 and the common electrode 310, the first liquid crystal 712 and the second liquid crystal 722 is vertically aligned. Thus, the liquid crystal display panel 600 may be vertically aligned mode.

Figure 6A:
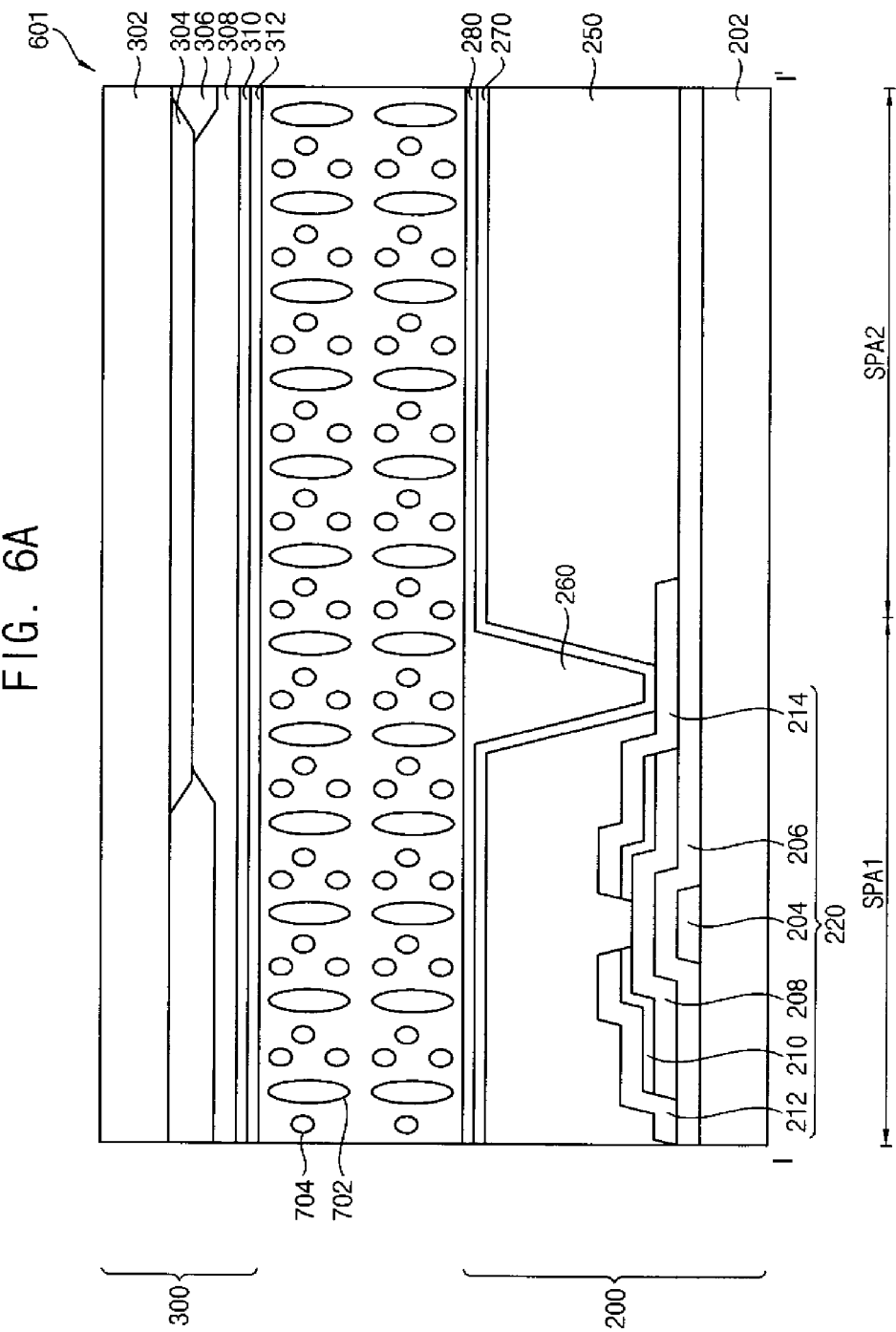
Figure 6C:
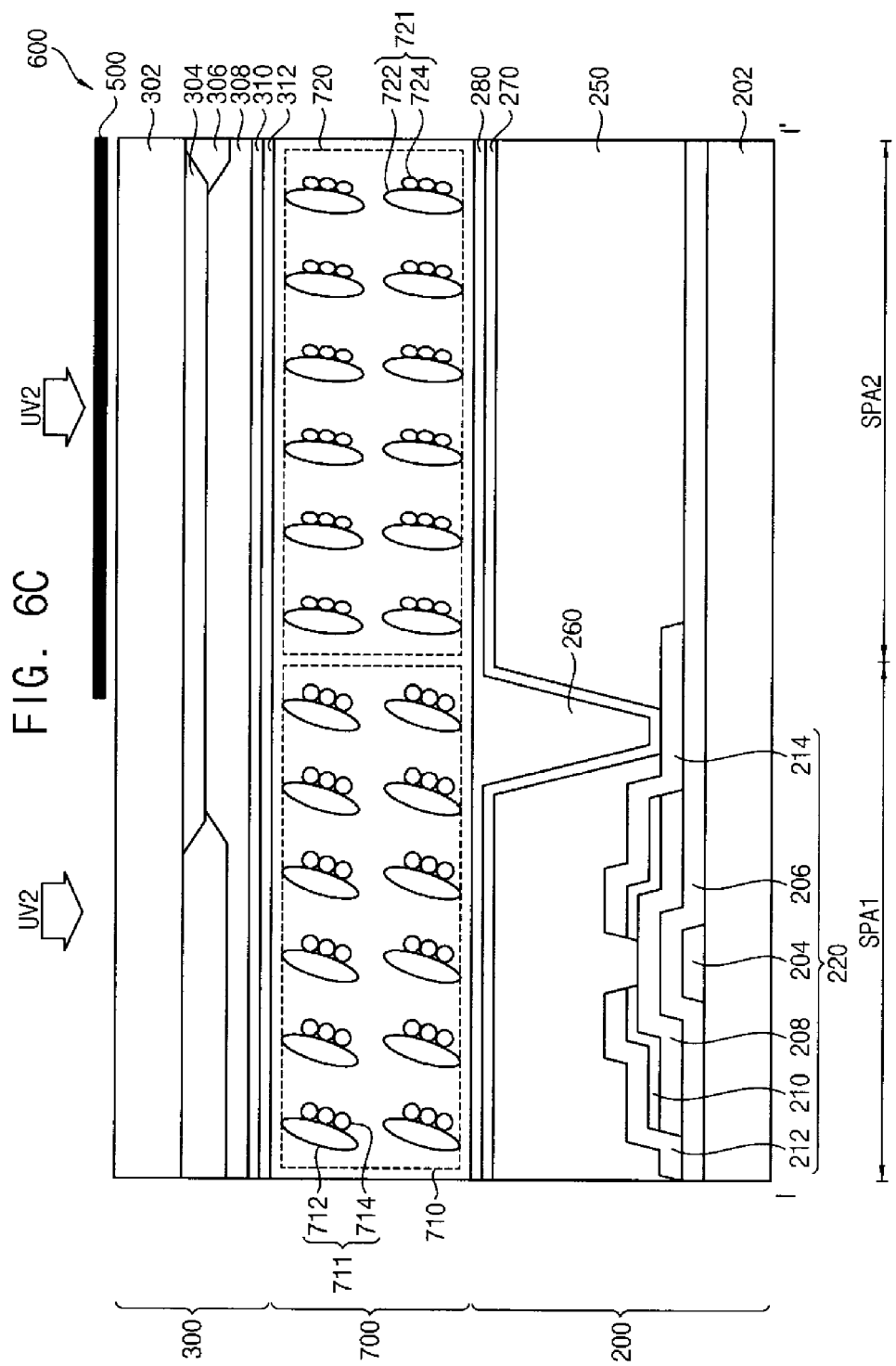

FIG. 6A to 6C are cross-sectional views illustrating a method of manufacturing the liquid crystal display panel 600 in FIG. 5.

Referring to FIG. 6A, a panel 601 is formed. Specifically, the lower substrate 200 is formed as illustrated in FIG. 3A. The upper substrate 300 is formed as illustrated in FIG. 3B. The lower substrate 200 and the upper substrate 300 are combined, and a liquid crystal 702 and a reactive mesogen 704 are injected between the lower substrate 200 and the upper substrate 300. Thus, the panel 601 is formed. The liquid crystal 702 may be an anisotropic liquid crystal, and the reactive mesogen 704 may be an anisotropic reactive mesogen. In addition, the liquid crystal 702 and the reactive mesogen 704 may be vertically aligned by the first alignment layer 280 and the second alignment layer 312.

Referring to FIG. 6B, a light blocking mask 500 is disposed over the first sub pixel area SPA1 of the panel 601, and a first ultraviolet ray UV1 is applied to the second sub pixel area SPA2 of the panel 601. Therefore, the liquid crystal 702 and the reactive mesogen 704 disposed in the second sub pixel area SPA2 are polymerized, and thus the second liquid crystal layer 720 including the second polymer 721 is formed. The temperature of the display panel 601 may be kept essentially constant during the above described manufacturing processes. Alternatively, heat and cooling may be applied to the display panel 601 such that the temperature of the display panel may be increased and decreased in the same way as described with reference to FIGS. 3D, 3E, 3F and 3G in the manufacturing of the liquid crystal display panel 100 shown in FIG. 3G. However the invention is not limited thereto. For example, heat and cooling may be applied to the display panel 601 according to manufacturing needs.

The first ultraviolet ray UV1 has a first power density, and the first ultraviolet ray UV1 is applied to the second sub pixel area SPA2 for a first time period. For example, the first power density of the first ultraviolet ray UV1 applied to the second sub pixel area SPA2 may be about 20 mW/cm$^2$, and the first ultraviolet ray UV1 may be applied to the second sub pixel area SPA2 for about 3 minutes.

Referring to FIG. 6C, the light blocking mask 500 is disposed over the second sub pixel area SPA2 of the panel 601, and a second ultraviolet ray UV2 is applied to the first sub pixel area SPA1 of the panel 601. Therefore, the liquid crystal 702 and the reactive mesogen 704 disposed in the first sub pixel area SPA1 are polymerized, and thus the first liquid crystal layer 710 including the first polymer 711 is formed. Thus, the liquid crystal layer 700 including the first liquid crystal layer 710 and the second liquid crystal layer 720 is formed, and the liquid crystal display panel 600 is formed.

The second ultraviolet ray UV2 has a second power density less than the first power density, and the second ultraviolet ray UV2 is applied to the first sub pixel area SPA1 of the panel 601 for a second time period longer than the first time period.

For example, the second power density of the second ultraviolet ray UV2 may be about 2 mW/cm$^2$, and the second ultraviolet ray UV2 may be applied to the first sub pixel area SPA1 for about 30 minutes.

In an exemplary embodiment, the first power density, the first time period, the second power density, and the second time period may be chosen such that the result of the multiplication between the first power density of the first ultraviolet ray UV1 and the first time period during which the first ultraviolet ray UV1 is applied to the second sub pixel area SPA2 may be equal to the result of the multiplication between the second power density of the second ultraviolet ray UV2 and the second time period during which the second ultraviolet ray UV2 is applied to the first sub pixel area SPA1. Thus, the energy applied to the second sub pixel SPA2 by the first ultraviolet ray UV1 may be substantially equal to the energy applied to the first sub pixel SPA1 by the second ultraviolet ray UV2.

Figure 7:
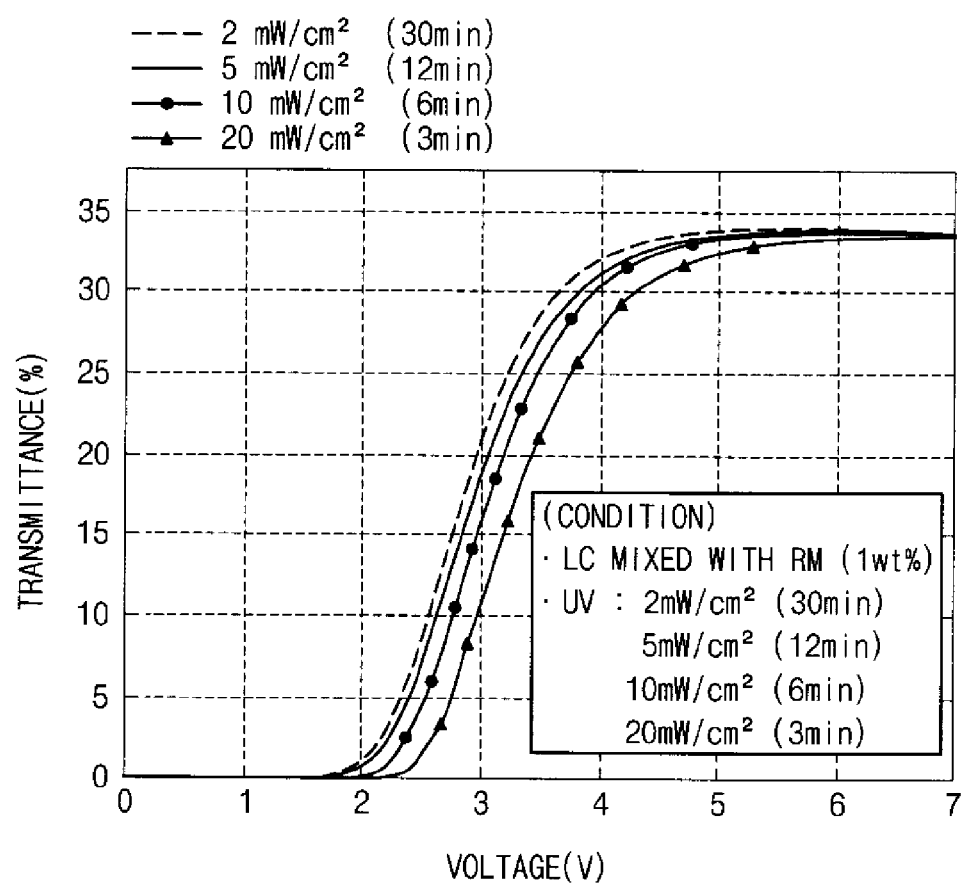
FIG. 7 is a graph illustrating a transmittance of a liquid crystal layer according to the voltage between the pixel electrode and the common electrode.

FIG. 7 is a graph illustrating a transmittance of the liquid crystal layer 700 according to the voltage between the pixel electrode 270 and the common electrode 310.

Referring to FIGS. 5, 6A, 6B, 6C and 7, a content of the first reactive mesogen 714 and the second reactive mesogen 724 in the liquid crystal layer 400 may be about 1 wt %.

Referring to the graph of FIG. 7, when the energy applied to the liquid crystal layer by the first ultraviolet ray UV1 and the energy applied to the liquid crystal layer by the second ultraviolet ray UV2 are equal, a thread voltage for aligning the first polymer 711 and the second polymer 721 decreases with a decrease in power density of the ultraviolet ray and with an increase in the exposure time during which the ultraviolet ray is applied to the panel 601.

For example, when a power density of the second ultraviolet ray UV2 applied to the first sub pixel area SPA1 is about 2 mW/cm$^2$ and the second ultraviolet ray UV2 is applied to the first sub pixel area SPA1 for about 30 minutes, a first thread voltage with respect to the first polymer 711 is about 1.5 volts. In contrast, when a power density of the first ultraviolet ray UV1 applied to the second sub pixel area SPA2 is about 20 mW/cm$^2$ and the first ultraviolet ray UV1 is applied to the second sub pixel area SPA2 for about 3 minutes, a second thread voltage with respect to the second polymer 721 is about 2.3 volts. Thus, the first thread voltage with respect to the first liquid crystal layer 710 is less than the second thread voltage with respect to the second liquid crystal layer 720.

In addition, when the energy delivered to the liquid crystal layer 700 by the first ultraviolet ray UV1 and the energy delivered to the liquid crystal layer 700 by the second ultraviolet ray UV2 are equal, the transmittance of the liquid crystal layer 700 is higher when the power density of the ultraviolet ray is lower and the time during which the ultraviolet ray is applied to the panel 601 is longer for the same voltage applied between the pixel electrode 270 and the common electrode 310 when the voltage is from about 1.9 volts to about 5.0 volts. Thus, a first transmittance corresponding to the first polymer 711 of the first liquid crystal layer 710 is greater than a second transmittance corresponding to the second polymer 721 of the second liquid crystal layer 720.

In the present exemplary embodiment, the first pre-tilt of the first polymer 711 is greater than the second pre-tilt of the second polymer 721, but the invention is not limited thereto. For example, the first pre-tilt of the first polymer 711 may be less than the second pre-tilt of the second polymer 721.

According to the present exemplary embodiment, the first liquid crystal layer 712 having a first pre-tilt and the second liquid crystal layer 722 having the second pre-tilt is manufactured by a method that does not involve the formation of an electric field between the pixel electrode 270 and the common electrode 310 before applying the first ultraviolet ray UV1 and the second ultraviolet ray UV2 to the panel 601. Therefore a simple way of forming a pre-tilt is provided for both the first liquid crystal 712 and the second liquid crystal 722 of the liquid crystal layer 700. Thus, the degradation of a contrast ratio that may occur during a process of forming the pre-tilt by applying an electric field may be prevented, and a response speed of the first liquid crystal 712 and the second liquid crystal 722 may be increased.

In addition, the first liquid crystal 712 disposed in the first sub pixel area SPA1 has the first pre-tilt, and the second liquid crystal 722 disposed in the second sub pixel area SPA2 has the second pre-tilt different from the first pre-tilt. Therefore, a multi-domain may be implemented, and thus a visibility angle of the liquid crystal display panel 600 may be increased.

Figure 8A:
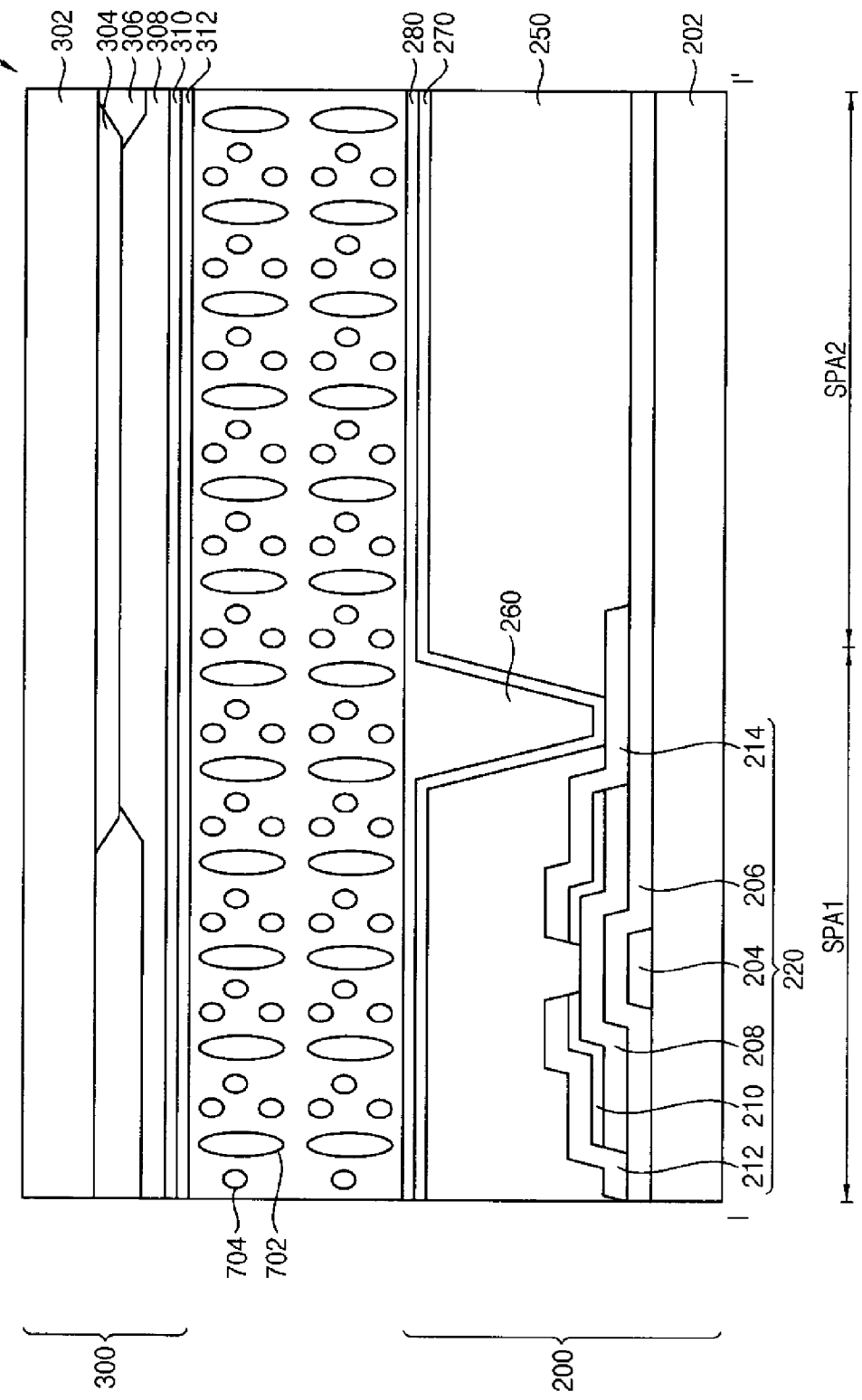
FIGS. 8A and 8B are cross-sectional views illustrating a method of manufacturing the liquid crystal display panel according to still another exemplary embodiment of the present invention.
Figure 8B:
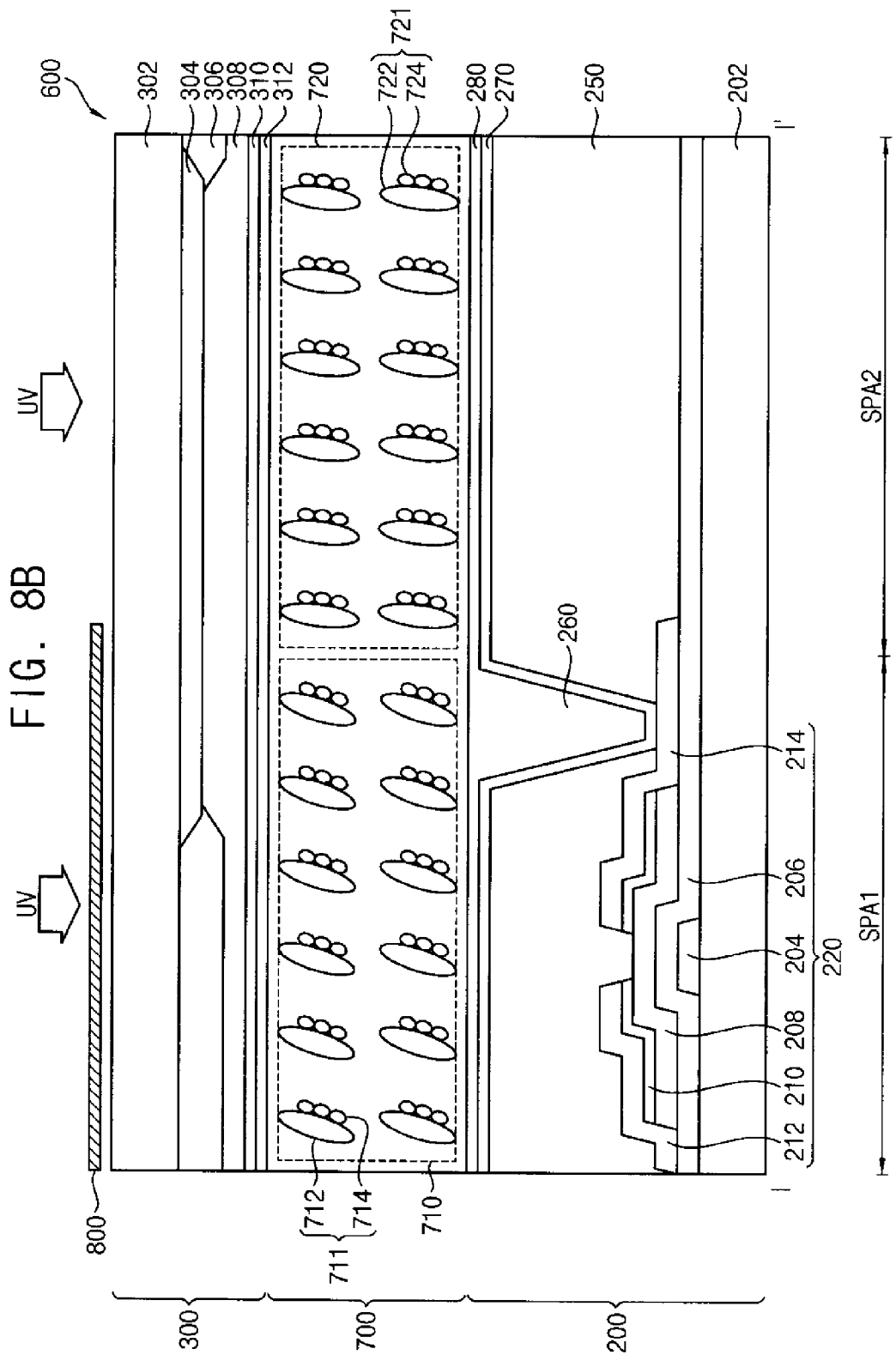

FIGS. 8A and 8B are cross-sectional views illustrating a method of manufacturing the liquid crystal display panel 600 according to still another exemplary embodiment of the present invention.

The method of manufacturing the liquid crystal display panel 600 according to the present exemplary embodiment illustrated in FIGS. 8A and 8B may be the method of manufacturing the liquid crystal display panel 600 of the previous exemplary embodiment illustrated in FIG. 5. Thus, the same reference numerals will be used to refer to same or like parts as those described in the previous exemplary embodiment and any further repetitive explanation concerning the above elements will be omitted.

Referring to FIG. 8A, the panel 601 is formed. Specifically, the lower substrate 200 is formed as illustrated in FIG. 3A. The upper substrate 300 is formed as illustrated in FIG. 3B. The lower substrate 200 and the upper substrate 300 are combined, and the liquid crystal 702 and the reactive mesogen 704 are injected between the lower substrate 200 and the upper substrate 300. Thus, the panel 601 is formed. The liquid crystal 702 may be an anisotropic liquid crystal, and the reactive mesogen 704 may be an anisotropic reactive mesogen. In addition, the liquid crystal 702 and the reactive mesogen 704 may be vertically aligned by the first alignment layer 280 and the second alignment layer 312.

Referring to FIG. 8B, a semi-transmittance mask 800 is disposed over the first sub pixel area SPA1 of the panel 601, and an ultraviolet ray UV is applied to the first sub pixel area SPA1 and the second sub pixel area SPA2 of the panel 601. The semi-transmittance mask 800 may absorb or block part of the ultraviolet radiation incident on the mask 800 and transmit part of the ultraviolet ray incident on the mask 800 to the sub pixel area SPA1. The transmittance of the mask 800 may be dependent on the wavelength of the incident ultraviolet radiation. The transmittance of the mask 800 may be adjusted according to panel manufacturing needs.

The ultraviolet ray UV incident on the panel 601 has a first power density. Thus, the ultraviolet ray UV having the first power density is applied to the second sub pixel area SPA2, and the ultraviolet ray UV having a second power density less than the first power density is applied to the first sub pixel area SPA1. In addition, the ultraviolet ray UV may be applied to the first sub pixel area SPA1 and the second sub pixel area SPA2, and thus energy of the ultraviolet ray UV applied to the first sub pixel area SPA1 may be less than the energy of the ultraviolet ray UV applied to the second sub pixel area SPA2.

Therefore, the liquid crystal 702 and the reactive mesogen 704 disposed in the first sub pixel area SPA1 are polymerized, and thus the first liquid crystal layer 710 including the first polymer 711 having the first pre-tilt is formed. In addition, the liquid crystal 702 and the reactive mesogen 704 disposed in the second sub pixel area SPA2 are polymerized, and thus the second liquid crystal layer 720 including the second polymer 721 having the second pre-tilt is formed. Thus, the liquid crystal layer 700 including the first liquid crystal layer 710 and the second liquid crystal layer 720 is formed, and the liquid crystal display panel 600 is formed. The temperature of the display panel 601 may be kept essentially constant during the above described manufacturing processes. Alternatively, heat and cooling may be applied to the display panel 601 such that the temperature of the display panel may be increased and decreased in the same way as described with reference to FIGS. 3D, 3E, 3F and 3G in the manufacturing of the liquid crystal display panel 100 shown in FIG. 3G. However the invention is not limited thereto. For example, heat and cooling may be applied to the display panel 601 according to manufacturing needs.

According to the present exemplary embodiment, the first liquid crystal layer 712 having a first pre-tilt and the second liquid crystal layer 722 having the second pre-tilt is manufactured by a method that does not involve the formation of an electric field between the pixel electrode 270 and the common electrode 310 before applying the ultraviolet ray to the panel 601. Therefore a simple way of forming a pre-tilt is provided for both the first liquid crystal 712 and the second liquid crystal 722 of the liquid crystal layer 700. Thus, the degradation of a contrast ratio that may occur during a process of forming the pre-tilt by applying an electric field may be prevented, and a response speed of the first liquid crystal 712 and the second liquid crystal 722 may be increased.

In addition, the first liquid crystal 712 disposed in the first sub pixel area SPA1 has a first pre-tilt, and the second liquid crystal 722 disposed in the second sub pixel area SPA2 has a second pre-tilt different from the first pre-tilt. Therefore, a multi-domain may be implemented, and thus a visibility angle of the liquid crystal display panel 600 may be increased.

FIG. 9 is a block diagram illustrating a liquid crystal display apparatus according to still another exemplary embodiment of the present invention.

Referring to FIG. 9, the liquid crystal display apparatus 900 according to the present exemplary embodiment includes a liquid crystal display panel 910, a data driving part 920, a gate driving part 930 and a timing control part 940.

The display panel 910 receives a data signal based on an image data DATA to display an image. For example, the image data DATA may be a two-dimensional plane image data. Alternatively, the image data DATA may include a left-eye image data and a right-eye image data to display a three-dimensional stereoscopic image.

The display panel 910 includes a plurality of gate lines GL substantially parallel with a first direction D1, a plurality of data lines DL substantially parallel with a second direction D2 substantially perpendicular to the first direction D1, and a plurality of pixels. The first direction D1 may be substantially parallel with a long side of the display panel 910, and the second direction D2 may be substantially parallel with a short side of the display panel 910.

The liquid crystal display panel 910 may be substantially the same as the liquid crystal display panel 100 according to the previous exemplary embodiment illustrated in FIGS. 1 and 2. Thus, the liquid crystal display panel 910 may include the first sub pixel area SPA1 and the second sub pixel area SPA2. The first liquid crystal layer 410 including the first polymer 411 having the first pre-tilt may be disposed in the first sub pixel area SPA1, and the second liquid crystal layer 420 including the second polymer 421 having the second pre-tilt may be disposed in the second sub pixel area SPA2.

In an alternate embodiment, the liquid crystal display panel 910 may be substantially the same as the liquid crystal display panel 600 according to the previous exemplary embodiment illustrated in FIG. 5. Thus, the liquid crystal display panel 910 may include the first sub pixel area SPA1 and the second sub pixel area SPA2. The first liquid crystal layer 710 including the first polymer 711 having the first pre-tilt may be disposed in the first sub pixel area SPA1, and the second liquid crystal layer 720 including the second polymer 721 having the second pre-tilt may be disposed in the second sub pixel area SPA2. In yet another embodiment, the liquid crystal display panel 910 may be manufactured by substantially the same method as the method of manufacturing a liquid crystal display panel according to the exemplary embodiments illustrated in FIGS. 8A and 8B.

The data driving part 920 outputs data signals based on the image data DATA to the data lines DL in response to a first clock signal CLK1 and a horizontal start signal STH provided from the timing control part 940.

The gate driving part 930 generates gate signals using a vertical start signal STV and a second clock signal SLK2 provided from the timing control part 940 and outputs the gate signals to the gate lines GL.

The timing control part 940 receives the image data DATA and a control signal CON from an outside. The control signal CON may include a horizontal synchronous signal Hsync, a vertical synchronous signal Vsync and a clock signal CLK.

The timing control part 940 generates the horizontal start signal STH using the horizontal synchronous signal Hsync and outputs the horizontal start signal STH to the data driving part 920. In addition, the timing control part 940 generates the vertical start signal STV using the vertical synchronous signal Vsync and outputs the vertical start signal STV to the gate driving part 930. In addition, the timing control part 940 generates the first clock signal CLK1 and the second clock signal CLK2 using the clock signal CLK and outputs the first clock signal CLK1 to the data driving part 920 and the second clock signal CLK2 to the gate driving part 930.

According to the present example embodiment, the liquid crystal display panel 910 includes the first sub pixel area SPA1 and the second sub pixel area SPA2. In addition, the first liquid crystal layer 410 including the first polymer 411 having the first pre-tilt may be disposed in the first sub pixel area SPA1, and the second liquid crystal layer 420 including the second polymer 421 having the second pre-tilt may be disposed in the second sub pixel area SPA2. In an alternate embodiment, the first liquid crystal layer 710 including the first polymer 711 having the first pre-tilt may be disposed in the first sub pixel area SPA1, and the second liquid crystal layer 720 including the second polymer 721 having the second pre-tilt may be disposed in the second sub pixel area SPA2. In yet another embodiment, the liquid crystal display panel 910 may be manufactured by substantially the same method as the method of manufacturing a liquid crystal display panel according to the exemplary embodiments illustrated in FIGS. 8A and 8B. Thus, a visibility angle of the liquid crystal display apparatus 100 may be increased, and a display quality of the liquid crystal display apparatus may be enhanced.

According to the exemplary embodiments for the liquid crystal display panels, the methods of manufacturing the liquid crystal display panels and the liquid crystal display apparatus having the liquid crystal display panels, a pre-tilt may be formed by a simple process for both the first liquid crystal disposed in a first sub pixel area and the second liquid crystal disposed in a second sub pixel area. Thus, degradation of a contrast ratio may be prevented, and a response speed of the first liquid crystal and the second liquid crystal may be increased.

In addition, the first liquid crystal disposed in the first sub pixel area has a first pre-tilt, and the second liquid crystal disposed in the second sub pixel area has a second pre-tilt different from the first pre-tilt. Therefore, a multi-domain may be implemented, and thus a visibility angle of the liquid crystal display panel may be increased.

Thus, a display quality of a liquid crystal display apparatus including the liquid crystal display panel may be enhanced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display panel comprising:
    a first substrate comprising a first base substrate and a pixel electrode disposed on the first base substrate, the first base substrate comprising a first sub pixel area and a second sub pixel area;
    a second substrate comprising a second base substrate and a common electrode disposed on the second base substrate, the second base substrate facing the first base substrate; and
    a liquid crystal layer interposed between the first substrate and the second substrate and comprising a first polymer disposed in the first sub pixel area and a second polymer disposed in the second pixel area,
    wherein the first polymer and the second polymer are pre-tilted with respect to a vertical axis:
    the first polymer is an isotropic polymer and has a first pre-tilt;
    the second polymer is an anisotropic polymer and has a second pre-tilt different from the first pre-tilt; and
    the first pre-tilt is greater than the second pre-tilt.

2. The liquid crystal display panel of claim 1, wherein the first polymer comprises a first liquid crystal and a first reactive mesogen polymerized in the first liquid crystal.

3. The liquid crystal display panel of claim 2, wherein the first reactive mesogen is an isotropic reactive mesogen.

4. The liquid crystal display panel of claim 1, wherein the second polymer comprises a second liquid crystal and a second reactive mesogen polymerized in the second liquid crystal.

5. The liquid crystal display panel of claim 4, wherein the second reactive mesogen is an anisotropic reactive mesogen.

6. The liquid crystal display panel of claim 1, wherein a voltage-transmittance characteristic of the first polymer differs from a voltage-transmittance characteristic of the second polymer.

7. A liquid crystal display apparatus comprising:
    a liquid crystal display panel comprising:
        a first substrate comprising a first base substrate having a first sub pixel area and a second sub pixel area, a gate line, a data line, and a pixel electrode,
        a second substrate comprising a second base substrate having a common electrode, the second base substrate facing the first base substrate, and
        a liquid crystal layer interposed between the first substrate and the second substrate and comprising a first polymer disposed in the first sub pixel area and a second polymer disposed in the second pixel area;
    a gate driving part configured to apply a gate signal to the gate line of the liquid crystal display panel; and
    a data driving part configured to apply a data signal to the data line of the liquid crystal display panel,
    wherein the first polymer and the second polymer are pre-tilted with respect to a vertical axis:
    the first polymer is an isotropic polymer and has a first pre-tilt;
    the second polymer is an anisotropic polymer and has a second pre-tilt different from the first pre-tilt; and
    the first pre-tilt is greater than the second pre-tilt.

* * * * *